United States Patent [19]

Ando

[11] Patent Number: 4,586,173
[45] Date of Patent: Apr. 29, 1986

[54] OPTICAL DISK

[75] Inventor: Hideo Ando, Tokyo, Japan

[73] Assignee: Tokyo Shibaura Denki Kabushiki Kaisha, Kawasaki, Japan

[21] Appl. No.: 511,963

[22] Filed: Jul. 8, 1983

[30] Foreign Application Priority Data

Jul. 12, 1982 [JP] Japan ................. 57-121004

[51] Int. Cl.⁴ ............................................. G11B 7/24
[52] U.S. Cl. .................... 369/275; 369/109; 369/279
[58] Field of Search ............. 369/44, 111, 109, 275, 369/279, 278, 277

[56] References Cited

U.S. PATENT DOCUMENTS

| | | | |
|---|---|---|---|
| 4,161,752 | 7/1979 | Basilico | 369/275 |
| 4,252,889 | 2/1981 | Linet | 369/111 |
| 4,310,916 | 1/1982 | Dil | 369/109 |
| 4,385,303 | 5/1983 | Akahira | 369/278 |
| 4,417,331 | 11/1983 | Lakaoka | 369/111 |
| 4,423,502 | 12/1983 | Dil | 369/275 |
| 4,513,407 | 4/1985 | Bricot | 369/44 |
| 4,517,666 | 5/1985 | Ando | 369/45 |

FOREIGN PATENT DOCUMENTS

| | | | |
|---|---|---|---|
| 26517 | 8/1981 | European Pat. Off. | 369/111 |
| 2408010 | 10/1974 | Fed. Rep. of Germany | 369/111 |
| 2853929 | 6/1981 | Fed. Rep. of Germany | 369/111 |
| 3131212 | 3/1982 | Fed. Rep. of Germany | 369/111 |
| 3200187 | 8/1982 | Fed. Rep. of Germany | 369/111 |
| 21507 | 3/1973 | Japan | 369/111 |
| 55-449 | 4/1980 | Japan | 369/111 |
| 105343 | 8/1981 | Japan | 369/111 |
| 137531 | 10/1981 | Japan | 369/111 |
| 169235 | 12/1981 | Japan | 369/111 |

*Primary Examiner*—Alan Faber
*Attorney, Agent, or Firm*—Cushman, Darby and Cushman

[57] ABSTRACT

In an optical disk, a light reflective layer is formed on a transparent substrate, and a groove serving as a tracking guide is formed on the surface of said light reflective layer, continuously extending along the circumference of the optical disk. Pits are formed in a light reflective layer on the bottom surface of the tracking guide. The depth and width of said groove are

$$\frac{2n-1}{4}\lambda - \frac{\lambda}{8}$$

and $w0/2$, respectively, and those of said pits are $$\frac{2n-1}{4}\lambda$$

and $w0/3$, respectively, where $\lambda$ is the wavelength of a laser beam, $w0$ is the diameter of a laser beam spot on the optical disk, and n is an integer.

10 Claims, 49 Drawing Figures

OPTICAL DISK

BACKGROUND OF THE INVENTION

This invention relates to an optical disk capable of reproducing and/or recording information.

Optical disks have been developed which may be applied to various fields as information carriers, from which information may be read out or reproduced and onto which information may be recorded. Such optical disks may include, for example, reproduction-type disks, such as the so-called compact disks for digital audio disk systems; video disks for optical video disk systems; and recording/reproduction-type disks for video file systems or computer output memory systems.

In such optical disks, a tracking guide is pre-formed before recording information onto the optical disk for high-density recording, and pre-pits or pre-formation pits, such as codes representing the track number and sector number, are pre-formed to specify the recording or readout region. In a conventional information recording/reproducing system, the track number and sector number are read out from the pre-pits while tracing the tracking guide with a laser beam. Subsequently, information pits are formed and information is read out therefrom.

In the conventional optical disk, tracking guides are discontinuously or intermittently formed along its circumference. Flat regions between the circumferential tracking guides are defined as regions in which the information pits are to be formed. Thus, in writing information to form the information pits in the optical disk, there is the risk that the laser beam may be deviated from a predetermined track between the tracking guides, and that the information pits may fail to be formed in the prescribed regions. In reading out information from the optical disk in which information pits are formed, rows of information pits between the tracking guides function in the same manner as the tracking guides. Thus, the information pits are traced by the laser beam. However, since the information pits have depths which differ from that of the tracking guide, the rows of information pits are poor in their capacity to urge the laser beam to trace the predetermined track. Thus, the laser beam may often be deviated from the predetermined track, causing frequent errors.

Regarding the conventional optical disk, moreover, the combination of the width and depth of the pre-pits, and the tracking guide are not fully considered. Thus, information is not read out from the information pits and the pre-pits with satisfactory sensitivity while the tracking guide is being detected.

SUMMARY OF THE INVENTION

The object of the present invention is to provide an optical disk which is capable of tracing a tracking guide and reading out information from pits with a high degree of sensitivity.

According to one aspect of the invention, an optical disk is provided which comprises a disk-shaped plate having a first light reflective surface; a tracking guide being so defined by a groove formed on said first light reflective surface of the plate as to continuously extend along the circumference of the plate, said groove having a light reflective bottom surface; and first pits formed in the bottom surface of the groove, to reflect light, having a width shorter than that of the tracking guide.

According to another aspect of the invention, an optical disk is provided which comprises a disk-shaped plate having a first light reflective surface; a tracking guide defined by a ridge which is so formed on said first light reflective surface of the plate as to continuously extend along the circumference of the plate, said ridge having a light reflective top surface; and projections formed on said top surface of the ridge, to reflect light, having a width shorter than that of the tracking guide.

DETAILED DESCRIPTION OF THE PREFERRED EMBODIMENT

Figure 1:
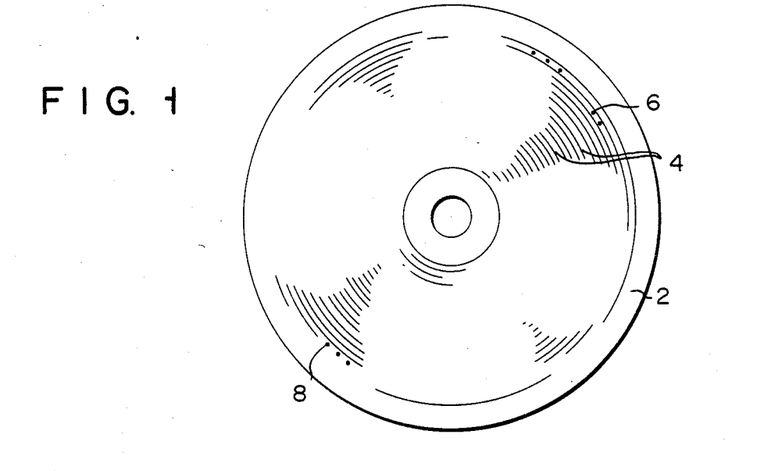
FIG. 1 is a plan view of an optical disk according to one embodiment of this invention.

With reference to FIG. 1, an optical disk 2 according to one embodiment of this invention is shown. A tracking guide or guides 4 which are spiral shaped or concentric are continuously or successively pre-formed on the surface of the optical disk 2 along the circumference thereof. Before information is recorded on the optical disk 2, format segments 6, e.g., pits, as codes representing the track number and sector number are formed on or in the tracking guide (or guides) 4. After the information, i.e., a video or audio signal, is recorded, information pits 8 functioning as information codes are formed between groups of the format segments 6 on or in the tracking guide 4. The depth or height d1 of the tracking guide 4 is approximately $$\left( \frac{2n-1}{4} \lambda - \frac{\lambda}{8} \right),$$

while the depth or height d2 of the format segments 6 is approximately $$\left( \frac{2n-1}{4} \lambda \right).$$

Figure 2:
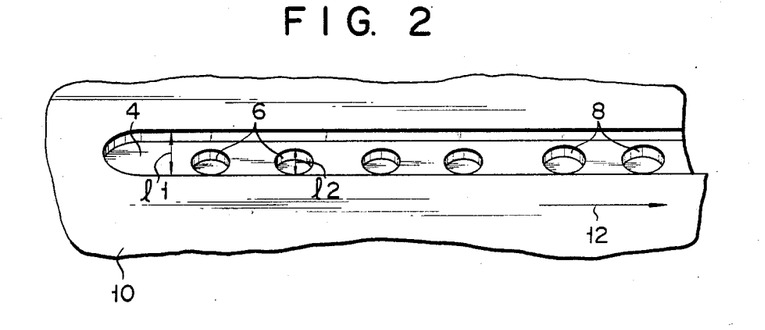
FIG. 2 is a perspective view showing part of the optical disk shown in FIG. 1.
Figure 3:
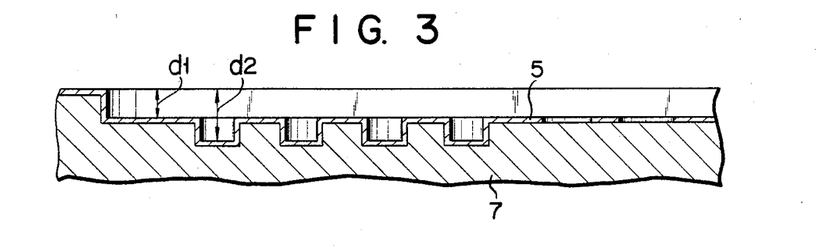
FIG. 3 is a sectional view of to FIG. 2.
Figure 4:
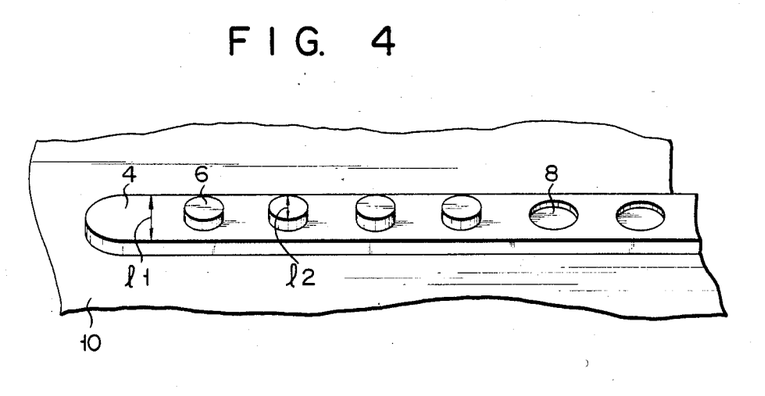
FIG. 4 is a perspective view showing part of an optical disk according to another embodiment of the invention.
Figure 5:
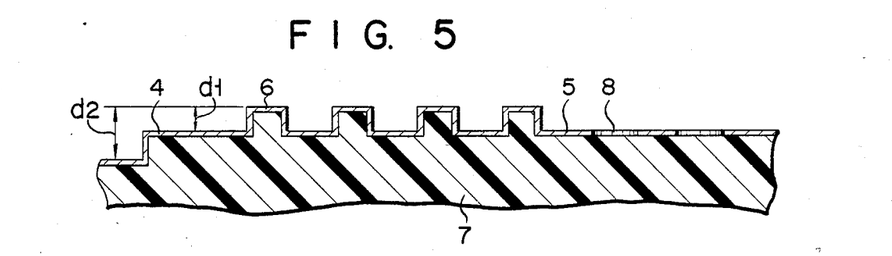
FIG. 5 is a sectional view of to FIG. 4.

Here, n is an integer and λ represents a laser wavelength. If the tracking guide 4 is a continuous groove on the optical disk 2, then it is formed at the depth d1 below a flat surface 10 of the optical disk 2, as shown in FIGS. 2 and 3. If the format segments 6 are formed as pits or recesses at the bottom of the groove, the pits or recesses have the depth d2 below the flat surface 10 of the optical disk 2. If the tracking guide 4 is a continuous ridge, as shown in FIGS. 4 and 5, then it is formed at the height d1 above the flat surface 10 of the optical disk 2. If the format segments 6 are formed as projections on the tracking guide 4, such projections will have a height d2 extending above the flat surface 10 of the optical disk 2.

The width l1 of the tracking guide 4 is greater than the width l2 of the pits or projections 6. Preferably, the widths l1, l2 of the tracking guide 4 and the pits or projections 6 are approximately w0/2 and w0/3, respectively, where w0 is defined as the diameter of a region in which the light intensity is $1/e^2$ or more of the maximum light intensity obtained in the light intensity distribution of a beam spot formed on the optical disk 2. As seen from FIGS. 4 and 5, the pre-formation pits or projections 6 and the groove or ridge 4 are formed on a light reflective layer 5, which is formed on a transparent substrate 7 by the method mentioned later. The information pits 8 are formed by applying a laser beam with high intensity to the surface of the tracking guide 4 to melt and remove the light reflective layer.

In the embodiment described above, the light reflective layer 5 is selectively melted to form the pits 8 by irradiation with a high intensity laser beam, so as to prepare an information segment. However, it is not absolutely necessary to melt the layer 5. For example, the refractive index or reflectance of light of the layer 5 may be selectively changed by irradiation with a high intensity laser beam so as to prepare the desired information segment. It is also possible to allow the irradiated portions of the layer 5 to heave up, thereby preparing the desired information segment.

Figure 6:
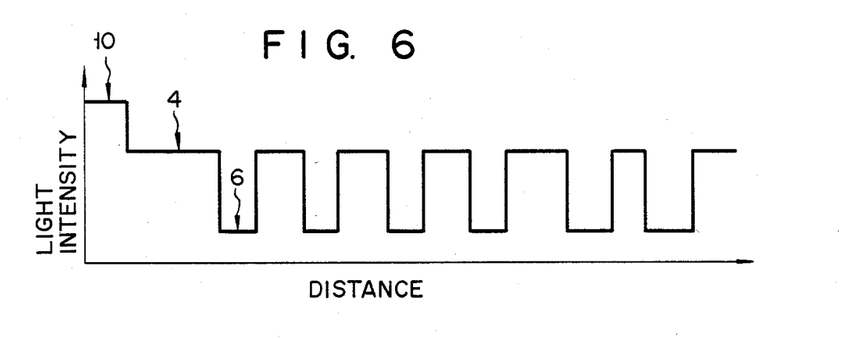
FIG. 6 is a graph illustrating the relationship between the distance and the light intensity of a laser beam reflected from the optical disk shown in FIGS. 2 and 4.

In the optical disk 2 of the structure described above, the tracking guide 4 and the pre-pits (or projections) 6 are detected with a high degree of sensitivity, and the information pits 8 are accurately formed by an optical system, as is stated in U.S. Ser. No. 390,775, which was filed on June 21, 1982, now U.S. Pat. No. 4,517,666, and EPC Publication No. 68390, which was published on Jan. 15, 1983 (The EPC Application No. 82105430.1 was filed on June 21, 1982). When this optical system is just in focus or in a focusing condition, a minimum beam spot or beam waist is formed on the optical disk 2, and an image of the beam spot is formed on a photoconductor. At this time, an image of the tracking guide 4 is formed as a diffraction pattern in the beam spot image on the photoconductor. The image of the tracking guide 4 is clearly formed when the tracking guide 4 has width l1 and height or depth d1. Thus, the tracking guide 4 is detected by the photoconductor with a high degree of sensitivity. The image of the pit or projection 6 is formed as dark spots in the beam spot image on the photoconductor. The image is clearly formed when the pit or projection 6 has width l2 and height (or depth) d2. Thus, the pits or projections 6 are detected with high sensitivity by the photodetector. If the beam spot is moved in the direction of an arrow 12 of FIG. 2 along the tracking guide 4, the intensity of the laser beam is changed on the photodetector. This change of light intensity is detected and converted into an electrical signal by the photodetector, as shown in FIG. 6. As may be seen from FIG. 6, the intensity level of the laser beam reflected from the flat surface 10 is highest, while that of the laser beam reflected with light reflected from the pre-pits or projections 6 and the information pits 8 is lowest. The intensity level of light reflected from the tracking guide 4 lies substantially halfway between these two levels. Thus, the tracking guide 4 and the pits or projections 6 and 8 can be detected with high reliability.

The above described optical disk 2 is manufactured as follows.

Figure 7A:
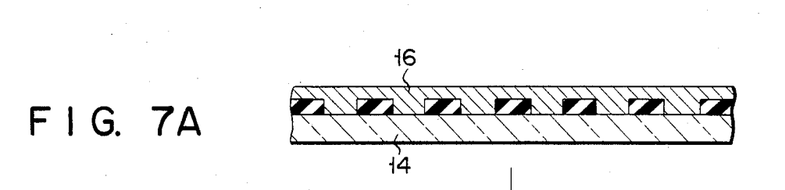
FIGS. 7A to 7F are diagrams illustrating processes for manufacturing an optical disk from a master disk thereof.
Figure 7B:
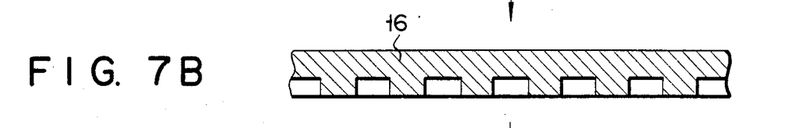
Figure 7C:
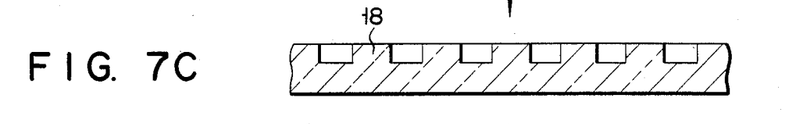
Figure 7D:
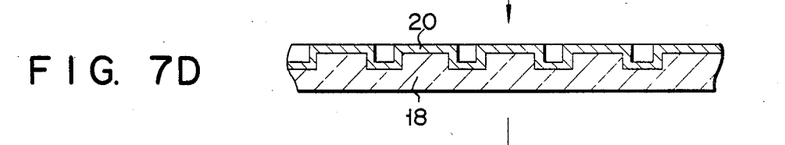
Figures 7E, 7F:
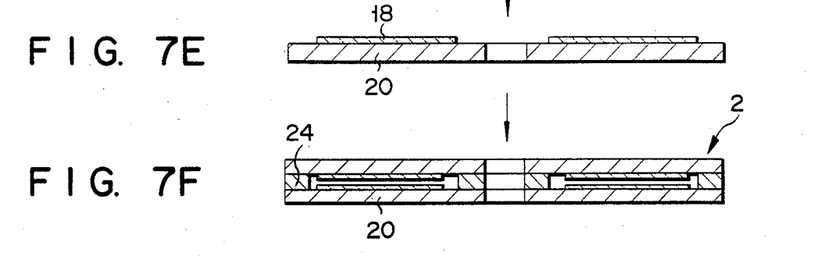

First, a master disk 14 made by any of various methods (to be mentioned later) is plated, as shown in FIG. 7A, to form the replica 16 shown in FIG. 7B. Then, a base disk 18 made of, e.g., transparent synthetic resin, as shown in FIG. 7C, is formed by the use of the replica 16 shown in FIG. 7B, and a metal layer is deposited on the surface of the base disk 18 to form a light reflective recording layer 20, as shown in FIG. 7D. The base disk 18 is worked into a predetermined shape, and is pasted onto a disk plate 22 made of glass or some other material, as shown in FIG. 7E. A pair of disk plates 22 each provided with the base disk 18 are pasted together with a spacer 24 between them, as shown in FIG. 7F, to complete the optical disk 2.

With reference to FIGS. 8 to 19B, various methods of manufacturing the master disk 14 shown in FIG. 7A may be described as follows.

Figure 8:
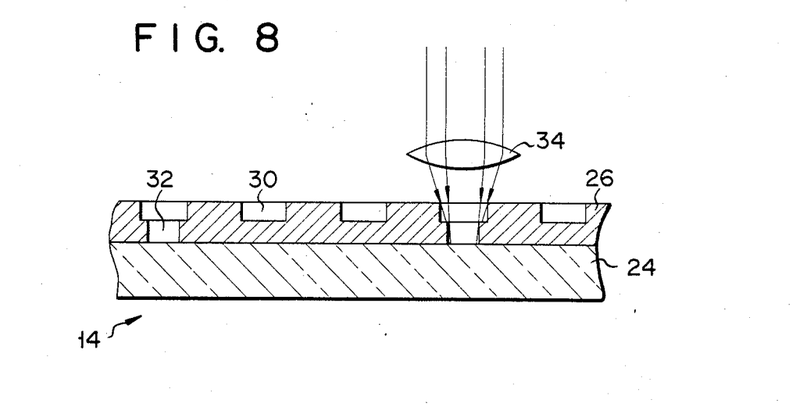
FIGS. 8 to 10, 11A to 11C, 12A to 12C, 13A to 13D, 14A to 14D, 15A to 15D, 16A to 16F, 17A to 17F, 18A and 18B, and 19A and 19B are diagrams illustrating several methods for manufacturing the master disk of various optical disks.

(1) As shown in FIG. 8, a metal layer 26 made of Te, Se, Bi, Cr or Al is deposited by vacuum evaporation, to a thickness of about 1,400 Å, on a substrate 24 made of glass or the like and having a polished flat surface. A laser beam 28 condensed by an objective lens 34 is applied to the metal layer 26. The laser beam 28 can be selectively adjusted to two light intensity levels. Thus, a recess 30 for the tracking guide with a depth of about 700 Å and recesses 32 for the information pits deep enough to reach the surface of the substrate 24 are formed to complete a master disk 14 of the optical disk.

Figure 9:
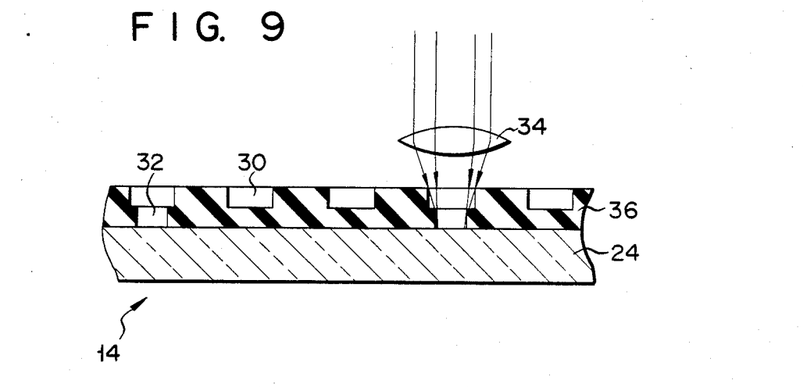

(2) As shown in FIG. 9, a photosensitive organic layer 36 made of a heat-sublimable organism, such as a nitrocellulose containing carbon, or thermoplastics, is formed on a substrate 24 made of glass or the like and having a polished flat surface. As in the case of item (1), a recess 30 for the tracking guide and recesses 24 for the information pits are formed on the photosensitive organic layer 36 by laser processing. Thus, a master disk 14 of the optical disk is completed.

Figure 10:
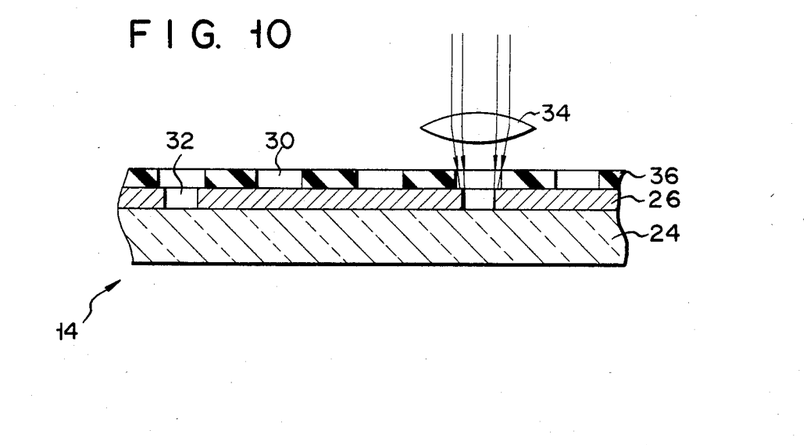

(3) As shown in FIG. 10, a metal layer 26 made of Te, Bi, Al or an alloy thereof is deposited on a substrate 24 by vacuum evaporation or sputtering, to a thickness of from 500 Å to 700 Å. Thereafter, a heat-sublimable organic layer 36 made of a nitrocellulose containing carbon or a thermoplastic resin, such as an epoxy resin containing carbon or an organic pigment, is formed on the metal layer 26 by spinner coating. A laser beam is applied at two alternative intensity levels. A recess 30 for the tracking guide is formed by removing only the heat-sublimable organic layer 36, and recesses 32 for the information pits are formed by removing both the heat-sublimable layer 36 and the metal layer 26. Thus, a master disk 14 of the optical disk is completed.

Figure 11A:
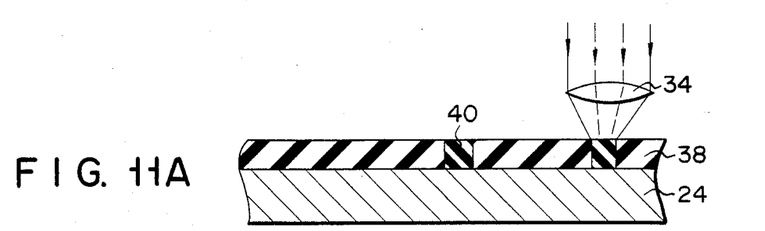
Figures 11B, 11C:
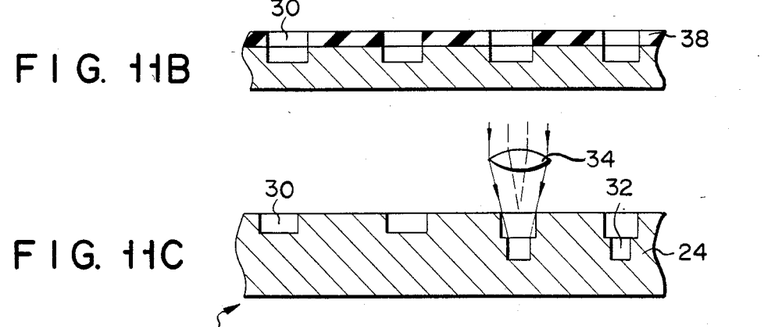

(4) As shown in FIG. 11A, a photoresist layer 38 is formed by spinner coating on a substrate 24 made of a light reflective photosensitive material. After a prescribed region of the photoresist layer 38 is exposed, it is developed and fixed. Thereafter, an exposed photoresist layer portion 40 is removed. Then, as shown in FIG. 11B, a recess 30 for the tracking guide is formed to the depth of from about 500 Å to 700 Å by dry etching or chemical etching, using the photoresist layer 38 as a mask. In the chemical etching, an aqueous solution of ferric chloride is used as the etching solution. Subsequently, after the photoresist layer 38 is removed in an organic solvent, the bottom surface of the recess 30 for the tracking guide is suitably removed by laser processing, as shown in FIG. 11C, as the substrate 24 is rotated on a turntable. Thus, recesses 32 for the information pits are formed to complete a master disk 14.

Figure 12A:
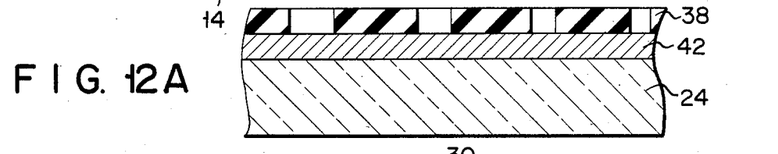
Figure 12B:
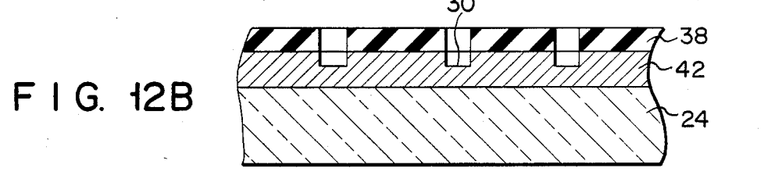
Figure 12C:
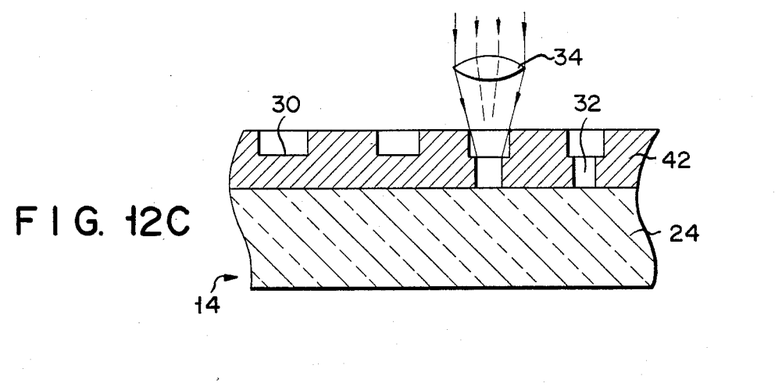

(5) As shown in FIG. 12A, a rugged layer 42 made of Al or the like is deposited to a thickness of from 1,000 Å to 1,400 Å on a substrate 24, by vacuum evaporation or sputtering. Then, a photoresist layer 38 is formed on the rugged layer 42 by spinner coating. After a prescribed region of the photoresist layer 38 is exposed, it is developed and fixed. Thereafter, the exposed photoresist layer portion is removed. Then, as shown in FIG. 12B, a recess 30 for the tracking guide is formed to a depth of from about 500 Å to 700 Å in the rugged layer 42, by etching, using the photoresist layer 38 as a mask. In this etching process, a 10 percent solution of sodium hydroxide or a 10 percent solution of potassium hydroxide is used as the etching solution. Subsequently, after the photoresist layer 38 is removed in an organic solvent such as alcohol, the bottom surface of the recess 30 for the tracking guide is suitably removed by laser processing, as shown in FIG. 12C. Thus, recesses 32 for the information pits are formed to complete a prototype 14.

Figure 13A:
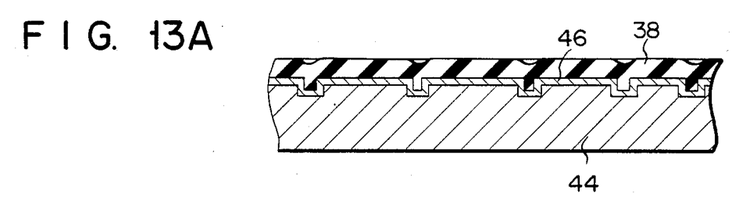
Figure 13B:
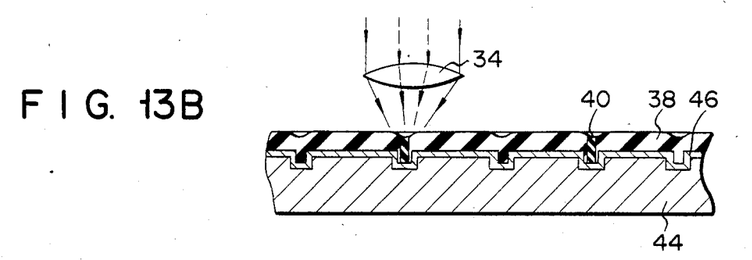
Figure 13C:
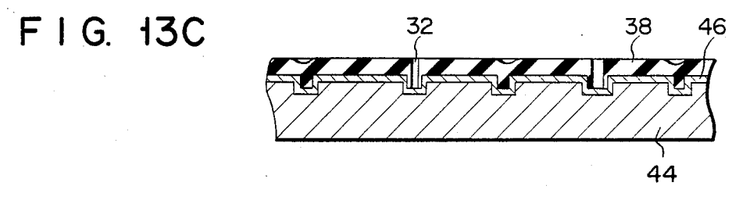
Figure 13D:
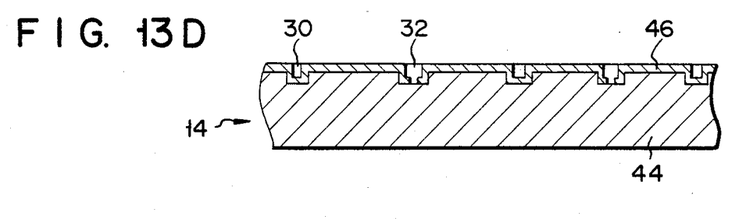

(6) As shown in FIG. 13A, an information layer 46 made of Cr, Cu, Al, Ni or stainless steel is deposited on a substrate 44 to which is previously transferred a fine rugged pattern corresponding to the tracking guide. Then, a positive photoresist layer 38 is formed on the information layer 46 by spinner coating. Subsequently, after those portions of the photoresist layer 38 which correspond to the information pits are exposed, as shown in FIG. 13B, while the substrate 44 is being rotated, they are developed and fixed, as shown in FIG. 13C. Thus, exposed photoresist layer portions 40 are removed. Then, the information layer 46 is etched by the chemical or dry etching method using the photoresist layer 38 as a mask. Thereafter, the photoresist layer 38 is removed in an organic solvent, as shown in FIG. 13D. Thus, a recess 30 for the tracking guide, having a depth of from about 500 Å to 700 Å and bottomed on a recessed surface of the information layer 46; and recesses for the information pits, each having a depth of from about 1,000 Å to 1,300 Å and bottomed on recessed surfaces of the substrate 44, are so formed as to complete a master disk 14.

Figure 14A:
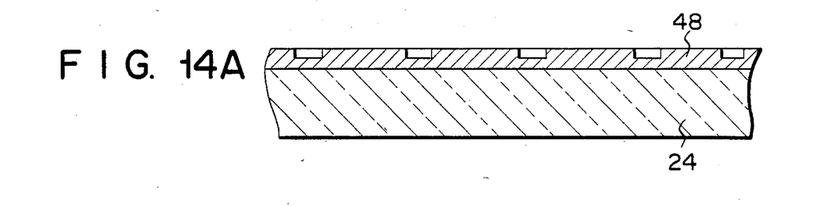
Figure 14B:
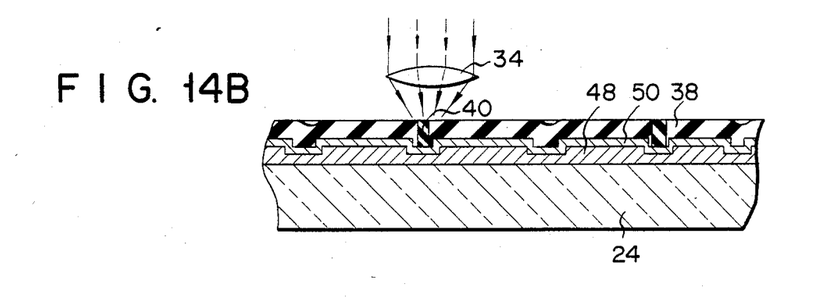
Figure 14C:
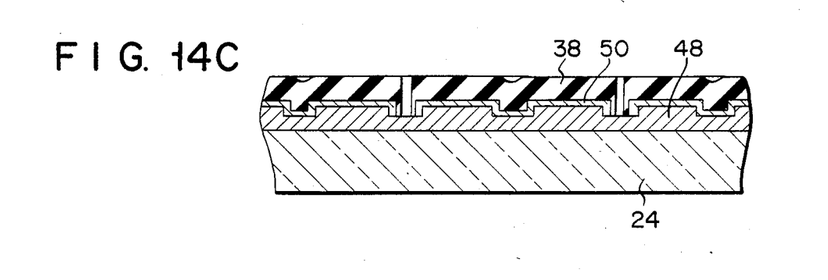
Figure 14D:
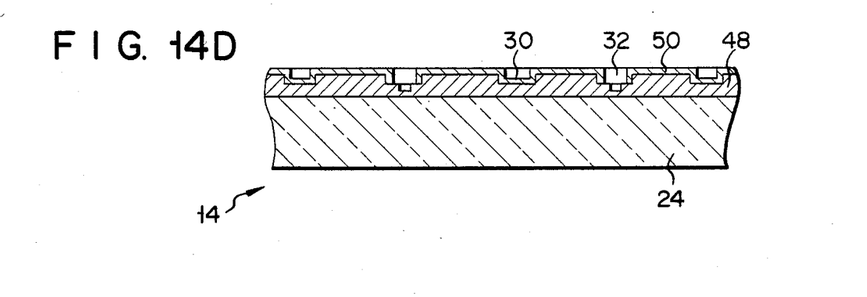

(7) As shown in FIG. 14A, a tracking guide layer 48 made of a light-setting resin, a thermosetting resin (e.g., acrylic monomers), or a cold-setting resin (e.g., epoxies) is formed on a substrate 24. A fine rugged pattern corresponding to the tracking guide 4 is transferred to the surface of the tracking guide layer 48. Then, a layer of Cr or other material is deposited to a thickness of from about 500 Å to 700 Å on the tracking guide layer 48 by vacuum evaporation to form an information layer 50, as shown in FIG. 14B. Thereafter, a photoresist layer 38 is formed on the information layer 50. Then, the photoresist layer 38 is exposed, developed, and fixed. Thereafter, the information layer 50 is etched by using the photoresist layer 38 as a mask, as shown in FIG. 14C, and the photoresist layer 38 is then removed by means of an organic solvent, as shown in FIG. 14D. Thus, a recess 30 for the tracking guide, having a depth of from about 500 Å to 700 Å and bottomed on a recessed surface of the information layer 50; and recesses 32 for the information pits 8, each having a depth of from about 1,000 Å to 1,300 Å and bottomed on recessed surfaces of the tracking guide layer 48, are formed to complete a master disk 14.

Figure 15A:
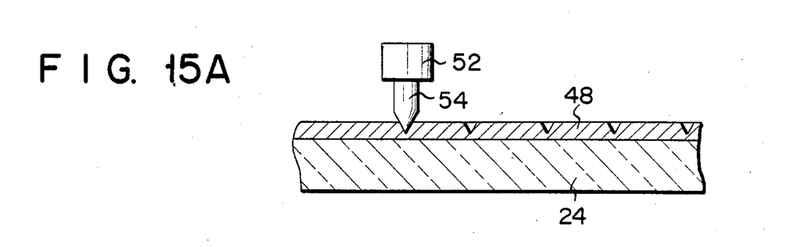

(8) As shown in FIG. 15A, a material susceptible to plastic deformation, such as Cu, In, Pb, etc., is deposited on a substrate 24, by vacuum evaporation or sputtering, to form a tracking guide layer 48. The tracking guide layer 48 may be formed by spinner coating from organic material, such as an epoxy resin, a polystyrene, a polyethylene, a silicone resin, etc., instead of from the aforesaid inorganic substance.

Then, the substrate 24 is rotated and a diamond stylus 54 fixed to a stylus holder 52 is brought into contact with the substrate 24 to cut it mechanically. Thus, the tracking guide layer 48 is subjected to local plastic deformation.

Figure 15B:
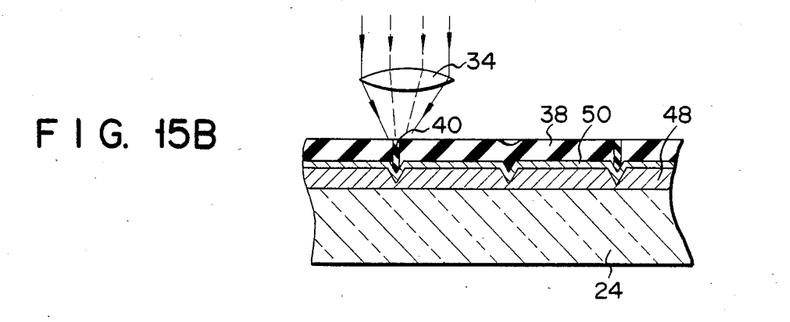
Figure 15C:
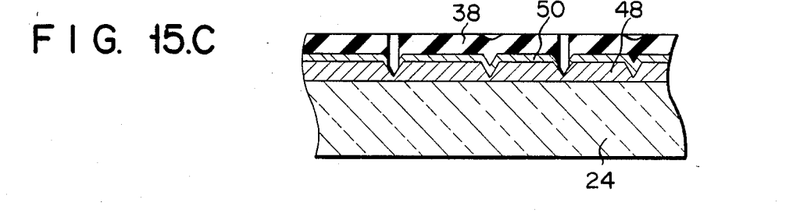
Figure 15D:
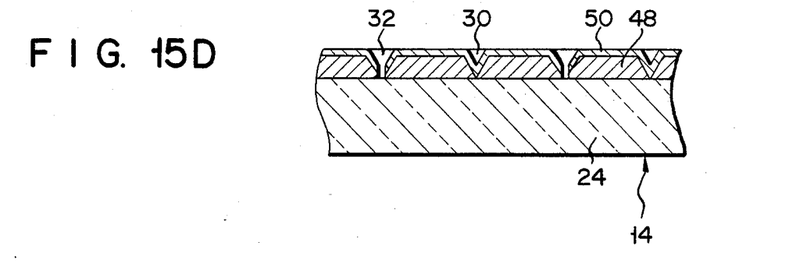

Subsequently, a layer of Cr or another material is deposited on the surface of the tracking guide layer 48 with a groove corresponding to the tracking guide, to form an information layer 50, as shown in FIG. 15B. Thereafter, a photoresist layer 38 is formed on the information layer 50. Then, a prescribed region of the photoresist layer 38 is exposed, developed, and fixed in such a way that an exposed photoresist layer portion 40 is removed. Thereafter, the information layer 50 is etched in an etching solution using the photoresist layer 38 as a mask, as shown in FIG. 15C. The etching solution used is prepared by adding 15 g of sodium hydroxide to 50 g/l of potassium permanganate. Then, the photoresist layer 38 is removed by means of an organic solvent, as shown in FIG. 15D.

Thus, a recess 30 for the tracking guide bottomed on a recessed surface of the information layer 50, and recesses 32 for the information pits bottomed on the surfaces of grooved portions cut into the tracking guide layer 48 are formed to complete a master disk 14.

Figure 16A:
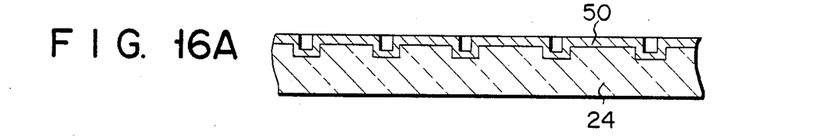
Figure 16B:
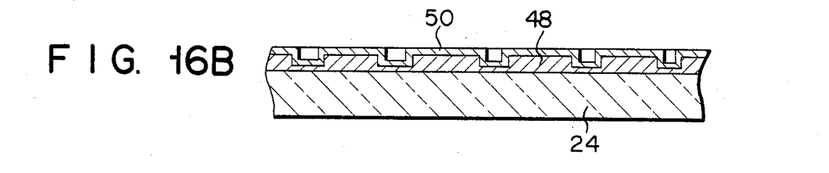

(9) A groove corresponding to the tracking guide is formed directly on a substrate 24, as shown in FIG. 16A, or on a tracking guide layer 48 which is formed on the substrate 24, as shown in FIG. 16B. Thereafter, a layer of Te or Al is deposited to a thickness of from 500 Å to 700 Å on the substrate 24 or the tracking guide layer 48, by vacuum evaporation or sputtering, to form an information layer 50.

Figure 16C:
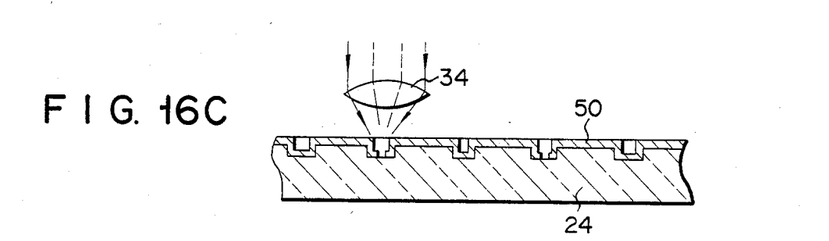
Figure 16D:
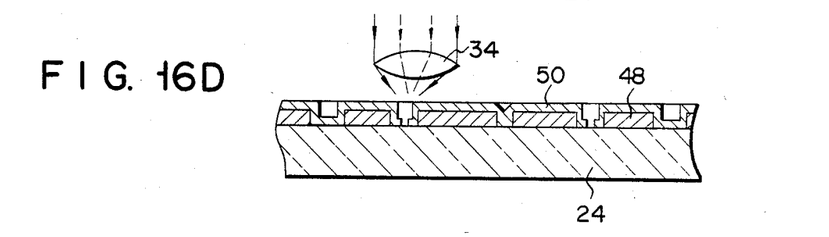
Figure 16E:
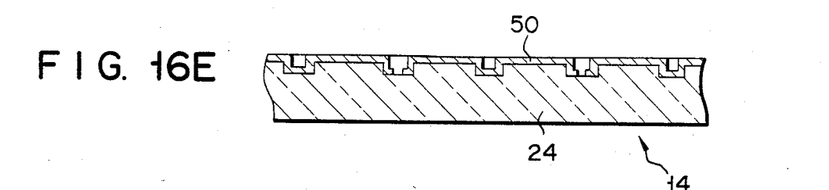
Figure 16F:
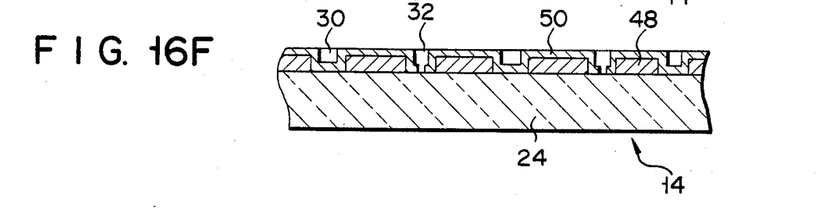

Then, the substrate 24 is rotated, and an objective lens 34 is moved in accordance with the vertical motion of the substrate 24 and the eccentricity of the groove corresponding to the tracking guide, as shown in FIGS. 16C and 16D, while using reflected light from the information layer 50 for focusing and tracking control. Thus, the groove corresponding to the tracking guide is continuously traced by a laser beam spot. The light intensity of the laser beam is increased at places to locally remove the information layer 50. Thus, as shown in FIGS. 16E and 16F, a recess 30 for the tracking guide bottomed on a recessed surface of the information layer 50 and recesses 32 for the information pits bottomed on the surface of the substrate 24 are formed to complete a master disk 14.

Figure 17A:
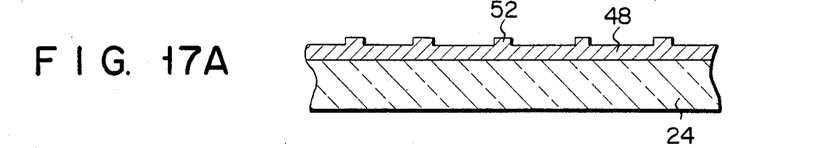
Figure 17B:
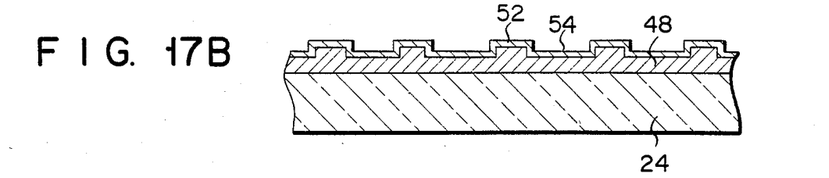
Figure 17C:
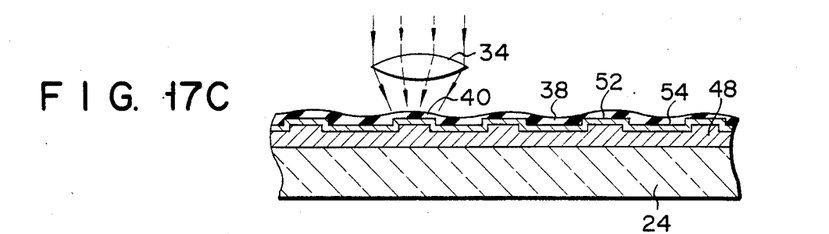
Figure 17D:
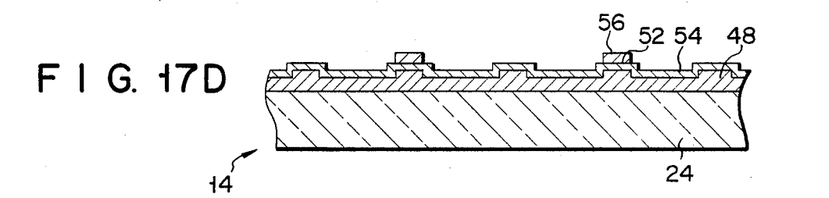

(10) As shown in FIG. 17A, a tracking guide layer 48 made of a light-setting resin, thermosetting resin or cold-setting resin is formed on a substrate 24. A fine ridge 52 corresponding to the tracking guide is transferred to the surface of the tracking guide layer 48. Then, a light reflective layer 54 of Cr is deposited to a thickness of from 50 Å to 100 Å on the tracking guide layer 48 by vacuum evaporation or sputtering, as shown in FIG. 17B. The light reflective layer 54 serves to provide a light reflective effect on the surface of the tracking guide layer 48, and to increase the efficiency of contact with a photoresist layer 38 mentioned below. Negative photoresist is applied to the surface of the light reflective layer 54 by spinner coating to form the photoresist layer 38 serving as an information layer. Then, the substrate 24 is rotated, and the ridge 52 for the tracking guide is traced by reflected light from the light reflective layer 54, as shown in FIG. 17C. At this time, the light intensity of the laser beam is increased at certain localities to form exposed photoresist layer portions 40. Then, the photoresist layer 38 is developed and fixed, and all parts of the layer 38 but the exposed portions 40 are removed, as shown in FIG. 17D. Thus, projections 56 for the information pits are so formed as to complete a prototype 14.

Figure 17E:
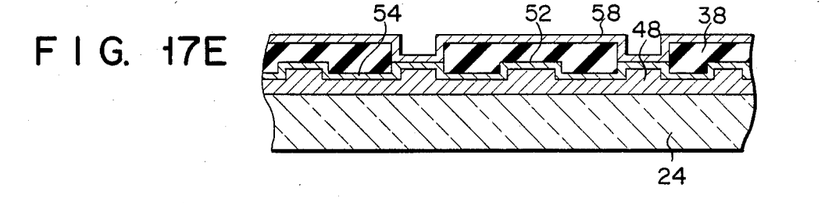
Figure 17F:
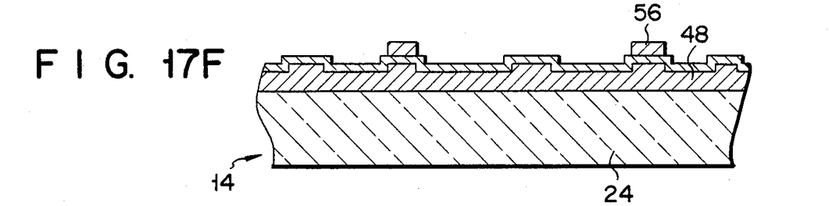

Alternatively, after the processes shown in FIGS. 17A to 17C are executed, a positive photoresist pattern is developed and fixed as a photoresist layer 38, in such a way that the exposed photoresist layers 40 are removed, and a layer of Cr is deposited on the photoresist layer 38 to form an information layer 58, as shown in FIG. 17E. Thereafter, when the photoresist layer 38 is removed by means of an organic solvent, only those portions of the layer 58 which are in direct contact with the light reflective layer 54 are left unremoved, as shown in FIG. 17F. Thus, projections 56 for the information pits are formed to complete a master disk.

Figure 18A:
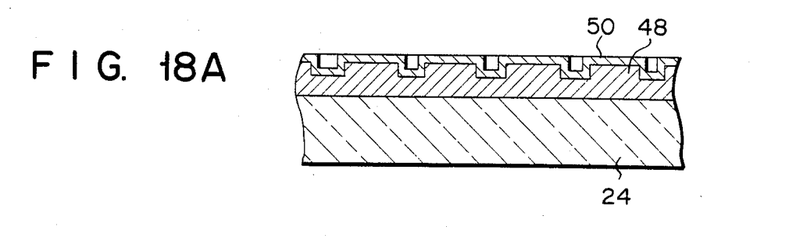
Figure 18B:
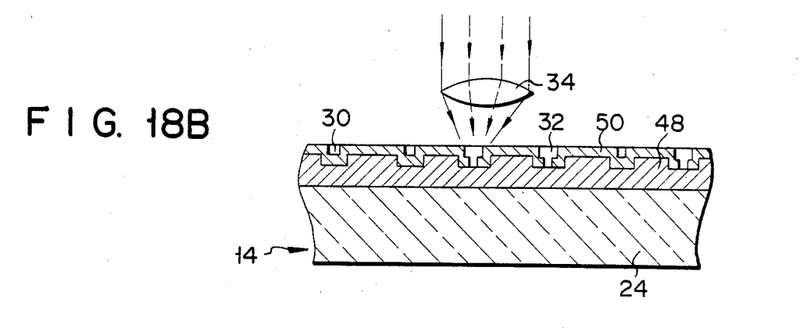

(11) As shown in FIG. 18A, a substrate 24 is coated with a tracking guide layer 48 made of a light-setting resin, thermosetting resin or cold-setting resin, and a groove corresponding to the tracking guide is formed on the tracking guide layer 48. Thereafter, Te, Bi, Se, Al or a heat-sublimable material, such as a nitrocellulose containing a pigment or carbon, is deposited to a thickness of from about 500 Å to 1,000 Å on the tracking guide layer 48 to form an information layer 50. Then, while the substrate 24 is rotated, the groove corresponding to the tracking guide is traced by a laser beam, as shown in FIG. 18B. The light intensity of the laser beam is increased at places to locally remove the information layer 50.

Thus, a recess 30 for the tracking guide bottomed on a recessed surface of the information layer 50, and recesses 32 for the information pits bottomed on recessed surfaces of the tracking guide layer 48 are formed to complete a master disk 14.

Figure 19A:
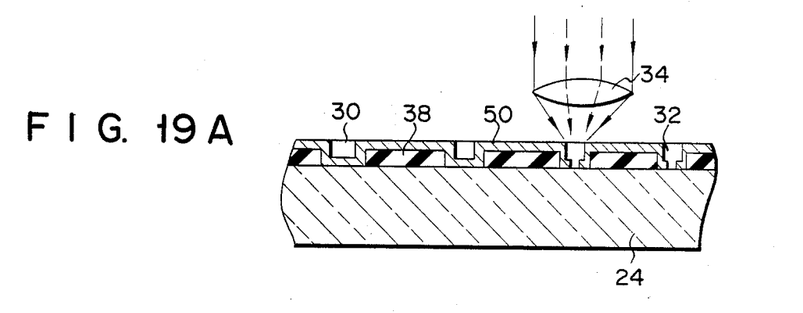

(12) As shown in FIG. 19A, a positive photoresist pattern is applied to a thickness of from 500 Å to 1,000 Å on a substrate 24, by spinner coating, to form a photoresist layer 38 which serves as a tracking guide layer. Then, the substrate 24 is rotated on a turntable, and the photoresist layer 38 is exposed to a laser beam converged by an objective lens 34. Thereafter, the photoresist layer 38 is developed and fixed so that exposed photoresist layer portions are removed. Then, Te, Bi, Se, Al or a heat-sublimable material, such as a nitrocellulose containing a pigment or carbon, is deposited to a thickness of from 500 Å to 1,000 Å on the photoresist layer 38, to form an information layer 50. Thus, a recess 30 for the tracking guide bottomed on a recessed surface of the information layer 50 is formed. Thereafter, the recess 30 is traced by the laser beam. The light intensity of the laser beam is increased at places to locally remove the information layer 50. Thus, recesses 32 for the information pits are formed to complete a master disk 14.

Figure 19B:
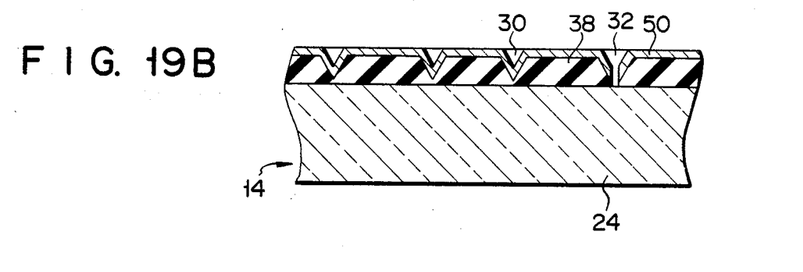

The recess 30 for the tracking guide may be made substantially V-shaped, as shown in FIG. 19B, by reducing the intensity of the laser beam applied to the photoresist layer 38.

This invention is not limited to the above-described methods of manufacturing the master disk 14, since various changes and modifications may be effected therein by one skilled in the art, without departing from the scope or spirit of the invention. Ideally, the recesses or projections for the information pits should be formed after the spiral or concentric groove or ridge for the tracking guide is formed and as the groove or ridge is traced. The recesses or projections for the information pits may be formed by extending the recess for the tracking guide or by filling up part of the recess.

What is claimed is:
1. A laser beam readable optical disk comprising:
  a disk-shaped plate having a first light reflective surface;
  a tracking guide defined by a groove which is so formed on said first light reflective surface of the plate as to continuously extend along the circumference of the plate, said groove having a flat light reflective bottom surface and a depth of substantially

$$\left(\frac{2n-1}{4}\lambda - \frac{\lambda}{8}\right),$$

where $\lambda$ is the wavelength of a laser beam converged on the optical disk, and n is an integer and a width of substantially w0/2, where w0 is the diameter of a laser beam spot formed on the optical disk;
  first pits formed on said bottom surface of the groove, to reflect light, having a width narrower than that of the tracking guide said first pits having a depth of $$\left(\frac{2n-1}{4}\lambda\right),$$

where $\lambda$ is the wavelength of said laser beam converged on the optical disk, and n is an integer the width being substantially w0/3, where w0 is the diameter of a laser beam spot formed on the optical disk.

2. The optical disk according to claim 1, wherein said disk-shaped plate is composed of a transparent substrate with a light reflective layer formed thereon, and said tracking guide and said first pits are composed of said light reflective layer.

3. The optical disk according to claim 2, further comprising second pits which are formed by removing a light reflective layer from the bottom surface of the groove.

4. The optical disk according to claim 1, wherein said tracking guide is of a spiral configuration.

5. The optical disk according to claim 1, wherein said tracking guide is concentric.

6. An optical disk comprising:
  a disk-shaped plate having a first light reflective surface;
  a tracking guide defined by a ridge which is so formed on said first light reflective surface of the plate as to continuously extend along the circumference of the plate, said ridge having a flat light reflective top surface said tracking guide having a height of substantially $$\left(\frac{2n-1}{4}\lambda - \frac{\lambda}{8}\right),$$

where λ is the wavelength of a laser beam converged on the optical disk, and n is an integer said tracking guide having a width of substantially w0/2, where w0 is the diameter of a laser beam spot formed on the optical disk; and projections formed on the top surface of the ridge, to reflect light, having a width narrower than that of the tracking guide said projections having a height of $$\left(\frac{2n-1}{4}\lambda\right),$$

where λ is the wavelength of a laser beam converged on the optical disk, and n is an integer said projections having a width of substantially w0/3, where w0 is the diameter of a laser beam spot formed on the optical disk.

7. The optical disk according to claim 6, wherein said disk-shaped plate is composed of a transparent substrate with a light reflective layer formed thereon, and said tracking guide and said projections are composed of said light reflective layer.

8. The optical disk according to claim 7, further comprising second pits which are formed by removing a light reflective layer from the top surface of the ridge.

9. The optical disk according to claim 6, wherein said tracking guide is of a spiral configuration.

10. The optical disk according to claim 6, wherein said tracking guide is concentric.

* * * * *